United States Patent
Okmyanskiy et al.

(10) Patent No.: US 8,680,987 B1
(45) Date of Patent: Mar. 25, 2014

(54) STREAMLINED DISTRIBUTION OF GPS ASSISTANCE DATA

(75) Inventors: Anton Okmyanskiy, Vancouver (CA); Jeffrey Antoline, Roswell, GA (US); Joseph Stewart, Lawrenceville, GA (US)

(73) Assignee: Cisco Technology, Inc., San Jose, CA (US)

( * ) Notice: Subject to any disclaimer, the term of this patent is extended or adjusted under 35 U.S.C. 154(b) by 405 days.

(21) Appl. No.: 12/886,656

(22) Filed: Sep. 21, 2010

(51) Int. Cl.
    *G08B 1/08* (2006.01)
(52) U.S. Cl.
    USPC ............. 340/539.13; 340/426.19; 340/995.24
(58) Field of Classification Search
    USPC ........... 340/539.13, 988–990, 426.19, 426.2, 340/426.28, 531, 539.1, 539.11, 995.24
    See application file for complete search history.

(56) References Cited

U.S. PATENT DOCUMENTS

| | | | | |
|---|---|---|---|---|
| 6,266,533 | B1 * | 7/2001 | Zadeh et al. | 455/456.2 |
| 6,275,773 | B1 * | 8/2001 | Lemelson et al. | 701/301 |
| 6,295,023 | B1 * | 9/2001 | Bloebaum | 342/357.62 |
| 6,323,803 | B1 * | 11/2001 | Jolley et al. | 342/357.42 |
| 7,598,907 | B2 * | 10/2009 | Thome et al. | 342/357.64 |
| 8,089,400 | B1 * | 1/2012 | Fang et al. | 342/357.42 |
| 2007/0118284 | A1 * | 5/2007 | Sposato et al. | 701/213 |
| 2009/0085801 | A1 * | 4/2009 | Sengupta et al. | 342/357.1 |
| 2011/0080321 | A1 * | 4/2011 | Farrokhi et al. | 342/357.63 |

OTHER PUBLICATIONS

Dr. N. Harper et al., "Process for Improving GPS Acquisition Assistance Data and Server-Side Location Determination for Cellular Networks," Presented at GNSS 2004; The International Symposium on GNSS/GPS; Sydney, Australia; Dec. 6-8, 2004.

* cited by examiner

*Primary Examiner* — Daniel Previl
(74) *Attorney, Agent, or Firm* — Edell, Shapiro & Finnan, LLC (57) ABSTRACT

Techniques are provided to streamline the distribution of global positioning system (GPS) assistance data to a plurality of devices, such as radio access point devices. A provisioning server generates GPS assistance data from satellite positioning data obtained by periodically querying a satellite positioning data server for the satellite positioning data for a plurality of satellites. The provisioning server assigns the GPS assistance data a configurable expiration time. The provisioning server automatically refreshes the GPS assistance data prior to its expiration and makes it available through for download by the radio access point devices.

25 Claims, 6 Drawing Sheets

STREAMLINED DISTRIBUTION OF GPS ASSISTANCE DATA

TECHNICAL FIELD

The present disclosure relates generally to provisioning radio access point devices to enable them to determine their global positioning system (GPS) location.

BACKGROUND

Devices that use global positioning system (GPS) technology for location determination functions rely on signals from multiple satellites to compute a location. Assisted GPS (AGPS) is a technology that provides GPS assistance data to the device to improve GPS lock in weak signal conditions. The GPS assistance data comprises data indicating approximate position of satellites that the device should try to lock to in its current position and time. Since satellites keep moving, the GPS assistance data keeps changing.

There is room for improving the manner in which the GPS assistance data is delivered to devices, particularly when there are numerous devices requesting the GPS assistance data resulting in excessive load on a satellite data server.

DESCRIPTION OF EXAMPLE EMBODIMENTS

Overview

Techniques are provided to streamline the distribution of GPS assistance data to a plurality of devices, such as radio access point devices. A provisioning server retrieves from a data server satellite positioning data for a plurality of GPS satellites. The provisioning server generates GPS assistance data comprising location and related data for the plurality of GPS satellites from the satellite positioning data. The provisioning server sends to a device data representing an expected location of the device, and sends the GPS assistance data to the device to enable it to select a subset of the plurality of GPS satellites based on the expected location of the device. The device uses that subset of satellites to attempt a GPS lock. The provisioning server converts the satellite position data into a GPS assistance data file which it caches, and the provisioning server fields requests from radio access point devices for the GPS assistance data thereby alleviating the data server from fielding the requests from numerous, e.g., millions, of radio access point devices. Moreover, the burden of selecting the GPS satellites best suited for a given radio access point device is placed on the radio access point device rather than on the data server or provisioning server. The data server and provisioning server merely serve as storing entities whereas the intelligence to select the best GPS satellites resides in the radio access point device.

Example Embodiments

Figure 1:
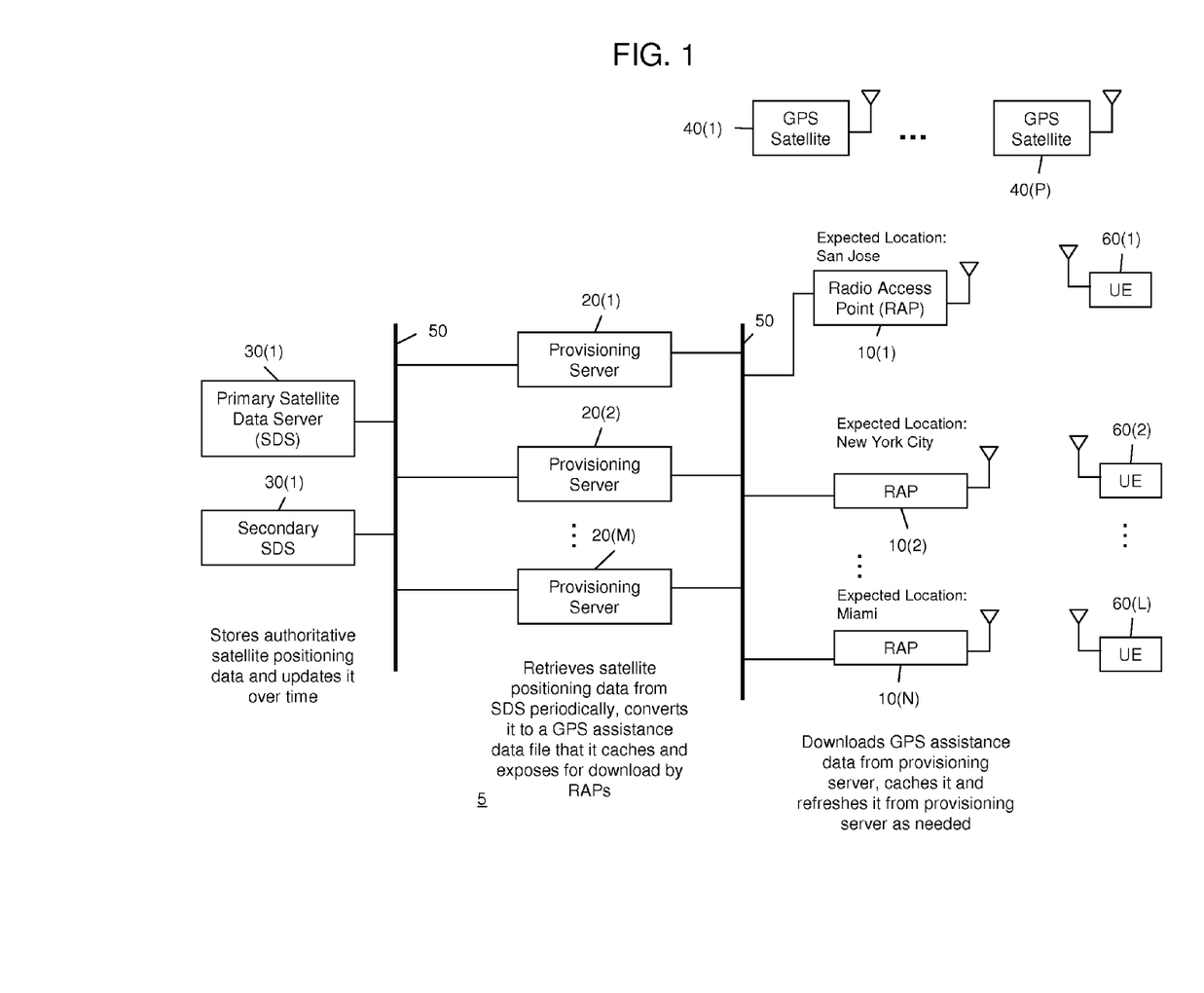
FIG. 1 is an example of a block diagram of a system for streamlined distribution of GPS assistance data to radio access point devices.

Referring first to FIG. 1, a block diagram is provided showing a system 5 configured for streamlined distribution of GPS assistance data to radio access points (RAPs) 10(1)-10(N). The system 5 comprises a plurality of provisioning servers 20(1)-20(M), a primary satellite data server (SDS) 30(1) and a secondary SDS 30(2). The GPS assistance data includes information pertaining to the approximate locations and types for each of a plurality of GPS satellites shown at 40(1)-40(P). The bold vertical lines in FIG. 1 are meant to depict a network 50. The provisioning servers 20(1)-20(M) communicate with the primary SDS 30(1) or secondary SDS 30(2) via the network 50 using standard network communication techniques. Similarly, the RAPs 10(1)-10(N) communicate with the provisioning servers 20(1)-20(M) via the network 50 using standard network communication techniques. For example, the network 50 is a combination of local and wide area networks, e.g., the Internet.

RAPs are deployed in order to improve coverage for user equipment (UE) devices in a wireless cellular network and to offload some servicing burden of the infrastructure of the wireless cellular network. Depending on the size and capacity of the RAP, it may be referred to as a "femtocell" access point device, a picocell access point device, a nanocell access point device or other terms or trade names used in the industry. Examples of UE devices are shown at reference numerals 60(1)-60(L). There are multiple RAPs deployed in different locations throughout areas where coverage is desired for the wireless network. For example, the expected deployment location for RAP 10(1) is in San Jose, the expected deployment location for RAP 10(2) is in New York City and the expected deployment location for RAP 10(N) is in Miami. The expected location information is represented more precisely by latitude/longitude information; the cities used in FIG. 1 are for example. If the service provider configures RAP 10(1) for service in San Jose then the provisioning server needs to verify the GPS location of RAP 10(1) before it is activated for service. For example, if RAP 10(1) determines its GPS location to actually be in Los Angeles whereas its expected location is in San Jose, then the service provider will not activate the RAP 10(1).

RAPs act as cellular radio transceiver towers in that they operate in licensed spectrum just like the larger and fixed cellular radio transceiver towers. However, since RAPs are by their nature movable from one location to another, deployment and service activation of RAPs involves location verification in order to ensure compliance with regulatory requirements. A RAP connects to one of the provisioning servers 20(1)-20(N) via the network 50. The provisioning server manages activation of RAPs 50 in the wireless cellular network. The RAPs route traffic associated with communication sessions with UEs to infrastructure of the wireless cellular network that, for simplicity, is not shown in FIG. 1.

The satellites 40(1)-40(P) are in orbit about the earth and transmit GPS signals from which a device, e.g., one of the RAPs 10(1)-10(N), derives its GPS location. However, depending on a location of a RAP, the GPS signals from only certain satellites may be useful at any given time due to receive signal strength caused by changes in location of the GPS satellites with respect to the location of the RAP. That is, the ability of a device to receive GPS signals from any given GPS satellite will depend on the location of the device with respect to the current location of the GPS satellite above the earth. The locations of the satellites above the earth also vary over time. Accordingly, when a device, such as one of the RAPs 10(1)-10(N), needs to perform a GPS location procedure (referred to herein as a "GPS lock"), it either attempts to scan for all satellites until it detects the few satellites with proper signal strength, or it could focus the limited scanning resources on the most likely satellites if GPS assistance data about the satellites' positions is provided. For example, the location of a RAP needs to be verified before it is enabled or re-enabled for service.

The GPS assistance data is data representing locations for a plurality of GPS satellites and also the types of GPS satellites that transmit GPS signals. In prior systems, a request for GPS assistance data from the RAP device and the location of the RAP device would be sent to a satellite position server which would return current satellites' location data for the RAP's expected position. This can cause significant load on the satellite position server.

According to the techniques described herein, a mechanism is provided to distribute GPS assistance data to a large number of devices, such as RAPs. The primary SDS 30(1) and secondary SDS 30(2) store authoritative satellite positioning data and update it over time. The secondary SDS 30(2) becomes active generally when the primary SDS 30(1) goes down or is taken out of service. Each SDS receives satellite positioning data from a global reference network and then parses and stores the applicable reference data. For example, each SDS obtains the satellite position data from a reference network that collects satellite feed and satellite monitoring information from its reference stations around the earth, and makes this information available to the SDS 30(1) and 30(2).

The provisioning servers 20(1)-20(N) serve as a set of redundant caching servers. Each provisioning server periodically polls satellite positioning data from the GPS data source. The provisioning server retrieves satellite positioning data for all satellites known to the satellite data server. Thus, the provisioning servers 20(1)-20(M) obtain satellite position data information for all satellites known to the SDS 30(1) or 30(2) at a given point in time, such as every 20-30 minutes (or some configurable time period). In another embodiment, a single provisioning server may query the SDS and then distribute the satellite positioning data among a set of redundant or regional provisioning servers.

The number of satellites (and their locations) indicated in the satellite positioning data will be more than the number of satellites that any given RAP will need to perform a GPS lock (assuming the RAP can receive a GPS signal with enough signal strength from a sufficient number of GPS satellites to perform the GPS computations). In one example, a provisioning server 20(1) receives the satellite positioning data from SDS 30(1) AND converts it into a GPS assistance data file that includes an expiration date within the file content or file name. The expiration date is configurable but is generally for a period of time that is greater than the rate at which satellite positioning data is updated from the SDS 30(1) or 30(2). In one example, each provisioning server 20(1)-20(M) stores the GPS assistance data file on a Hypertext Transport Protocol (HTTP) file server. A RAP 10(1), for example, downloads the GPS assistance data file via HTTP techniques from one of the provisioning servers, caches the GPS assistance data file and refreshes it as needed.

Figure 2:
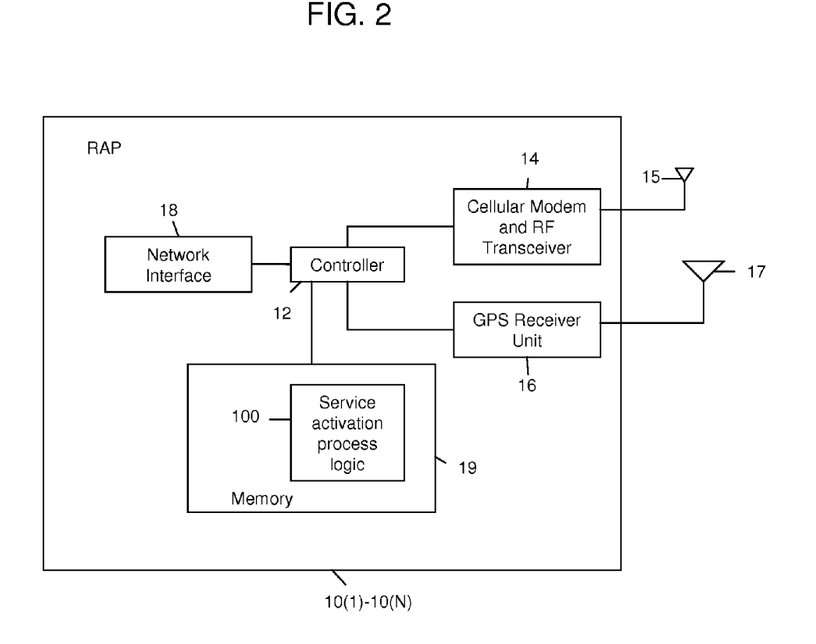
FIG. 2 is an example of a block diagram of a radio access point device configured to participate in the streamed distribution of GPS assistance data.

Turning now to FIG. 2, an example block diagram is shown of any one of the RAP devices 10(1)-10(N). The RAP comprises a controller 12 that serves as the primary control component of the RAP. There is a cellular modem and radio frequency (RF) transceiver unit 14 that is configured to perform the baseband and RF signal processing required to transmit and receive over-the-air signals according to a desired wireless communication standard that is employed in the wireless cellular network, much like the signals transmitted by the cellular radio transceiver towers. The cellular modem and RF transceiver unit 12 transmits signals and receives wireless (RF) signals via the antenna 15 in order to serve UEs in the wireless cellular network (FIG. 1). Thus, the RAP is said to be "enabled" or "re-enabled" for service when it has been configured or commanded to transmit and receive wireless radio signals with respect to UEs operating in the wireless cellular network. There is also a GPS receiver unit 16 that receives signals from GPS satellite transmitters via antenna 17. The controller 12 performs high level control of the cellular modem and RF transceiver unit 14 as well as the GPS receiver unit 16. A network interface unit 18 is provided that connects to the controller 12 and interfaces the RAP to network 50.

The controller 12 is, in one example, a programmable microprocessor or microcontroller, etc., that executes instructions encoded in a processor readable memory medium, e.g., memory 19. To this end, there are instructions encoded or otherwise stored in the memory 19 for service activation logic 100. The controller 12 executes the service activation process logic 100 in order to enable or activate service of the RAP.

The controller 12 is a data processing device, e.g., a microprocessor, microcontroller, systems on a chip (SOCs) processing device, or other fixed or programmable logic. The controller 12 interfaces with the memory 19 that may be any form of random access memory (RAM) or read only memory (ROM) or other tangible machine (computer or processor) readable tangible (non-transitory) memory medium that stores or is encoded with data and instructions used for the techniques described herein. The memory 19 may be separate or part of the controller 12.

The functions of the controller 12 may be implemented by a processor or computer readable tangible memory medium encoded with instructions or by logic encoded in one or more tangible media (e.g., embedded logic such as an application specific integrated circuit (ASIC), digital signal processor (DSP) instructions, software that is executed by a processor, etc.), wherein the memory 19 stores data used for the computations or functions described herein (and/or stores software or processor instructions that are executed to carry out the computations or functions described herein).

Figure 3:
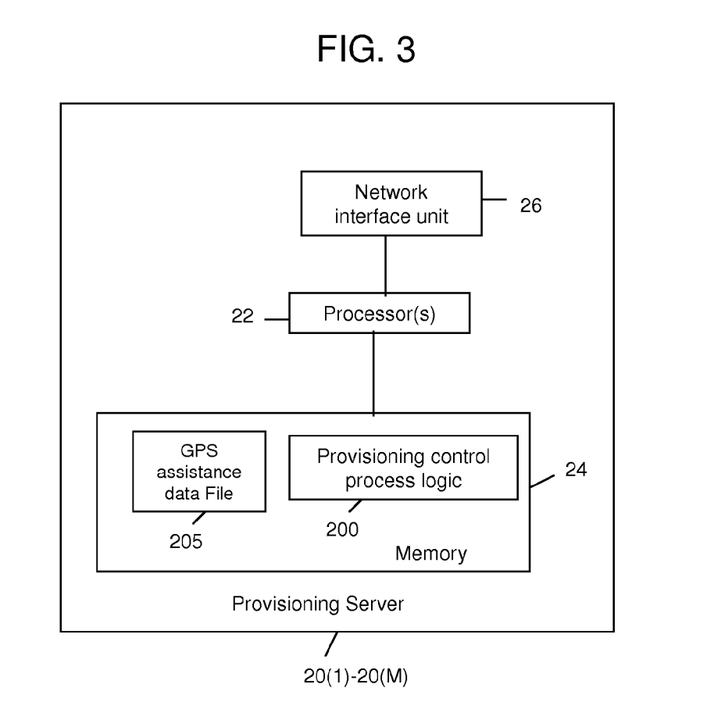
FIG. 3 is an example of a block diagram of a provisioning server that caches and downloads GPS assistance data to radio access point devices.

Reference is now made to FIG. 3 for a description of a block diagram of a provisioning server. FIG. 3 shows an example of a block diagram of any of the provisioning servers 20(1)-20(M) shown in FIG. 1. The provisioning server comprises one or more processors 22, a memory 24 and a network interface unit 26. The processor(s) 22 execute various programs stored in memory 24 to perform a variety of provisioning server functions. To this end, the memory 24 stores provisioning control process logic 200, that when executed, by the processor(s) 22, cause the processor(s) 22 to perform the operations described herein for the provisioning server. Also stored in memory 24 is a GPS assistance data file 205 that, as explained herein, the provisioning server generates from the updated satellite positioning data downloaded from the SDS 30(1) or 30(2). The network interface unit 26 is configured to enable communications over a network, e.g. network 50 shown in FIG. 1. The operations of the provisioning control process logic 200 are described hereinafter in connection with FIGS. 5 and 6.

Figure 4:
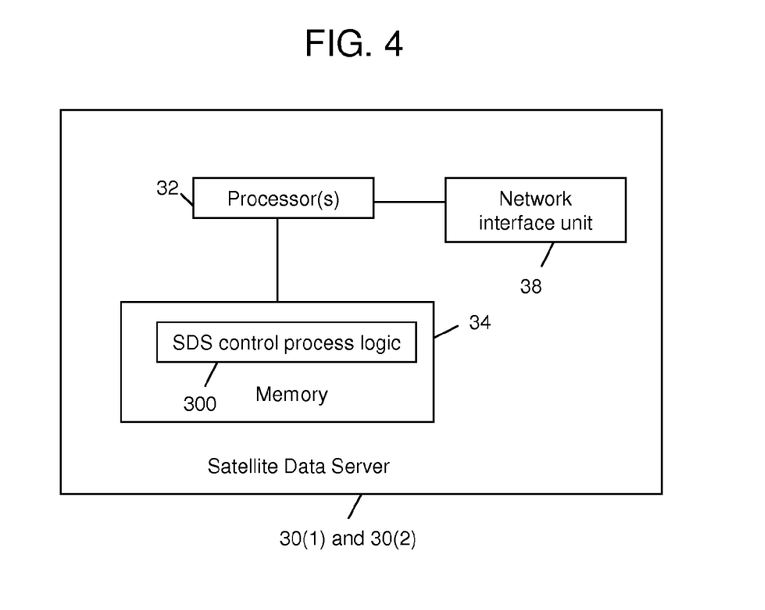
FIG. 4 is an example of a block diagram of a satellite data server that maintains satellite position data for distribution to provisioning servers.

FIG. 4 shows an example of a block diagram of the primary SDS 30(1) and secondary SDS 30(2). The SDS comprises one or more processors 32, a memory 34, and a network interface unit 38. The processor(s) 32 execute various programs stored in memory 34 including SDS control process logic 300. The SDS control process logic 300 causes the processor(s) 32 to perform functions described hereinafter in connection with FIG. 5. The SDS obtains updated satellite positioning data as described above, or may compute updated satellite positioning data from satellite positioning data at a previous update event using a model that predicts where the satellite will be located based on knowledge of the movements of the satellites.

Figure 5:
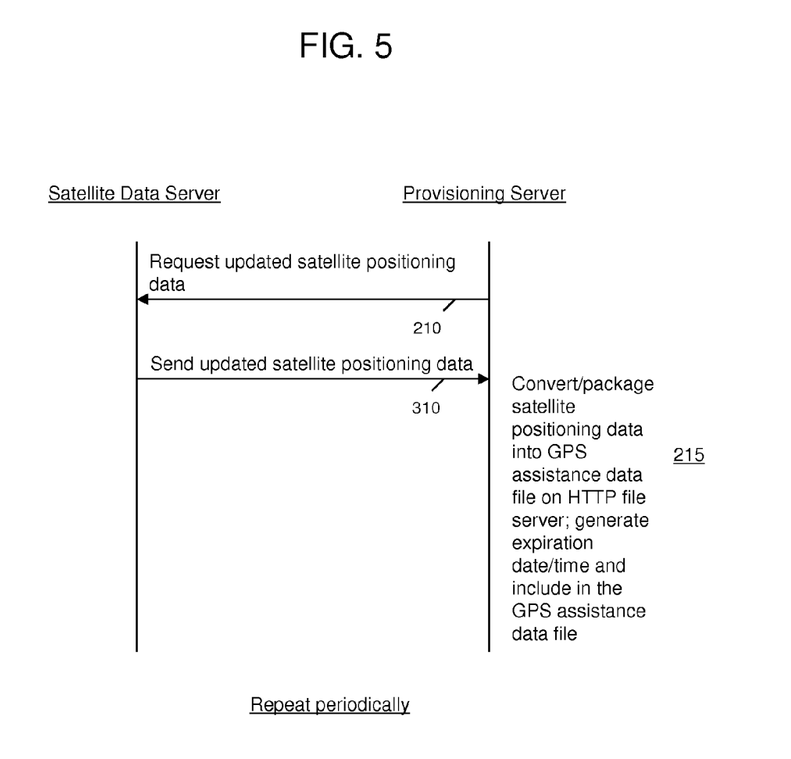
FIG. 5 is an example of a ladder flow diagram depicting how satellite position data is updated to provisioning servers from the satellite data server.
Figure 6:
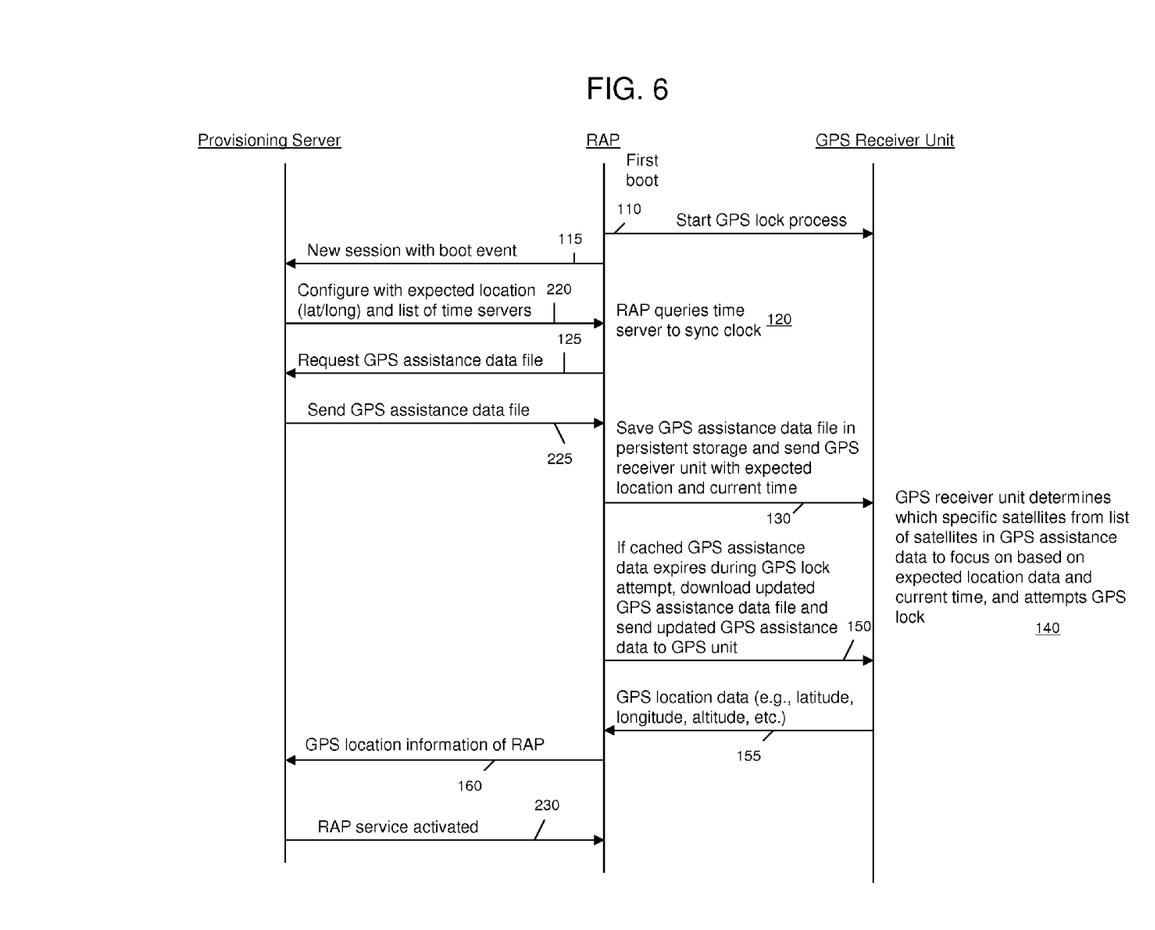
FIG. 6 is an example of a ladder flow diagram depicting the streamlined distribution of GPS assistance data to radio access point devices.

In FIGS. 5 and 6, operations with reference numerals in the 100's are operations of the service action process logic 100 in one of the RAPs 10(1)-10(N), operations with reference numerals in the 200's are operations of the provisioning control process logic 200 of one of the provisioning servers 20(1)-20(M) and operations with reference numerals in the 300's are operations of the SDS control process logic 300 of the SDS 30(1) and 30(2).

Reference is now made to FIG. 5 for a description of the operation of the SDS 30(1) and 30(2) in responding to a request for updated satellite positioning data from a provisioning server 20(1)-20(M). FIG. 5 shows a ladder diagram for the operations that occur in delivering updated satellite positioning data from an SDS to a provisioning server. At 210, a provisioning server sends a request to the SDS 30(1) or 30(2) to retrieve updated satellite positioning data. A provisioning server sends a request for updated satellite positioning data on a periodic basis (e.g., every 20-30 minutes) or on-demand basis. At 310, the SDS 30(1) or 30(2) responds with the latest satellite positioning data that it has obtained as described above. At 215, the provisioning server generates a GPS assistance data file comprising location and related information for the plurality of GPS satellites. In so doing, the provisioning server converts/packages the retrieved satellite positioning data into a GPS assistance data file that it stores on a HTTP file server, for example. The provisioning server also generates a configurable expiration date or time that it includes in the GPS assistance data file name or content. The operations shown in FIG. 5 may be performed repeatedly over time so that each provisioning server 20(1)-20(M) has up-to-date GPS assistance data. The provisioning servers generate an expiration time/date for the GPS assistance data file that they generate and are configured to automatically downloaded updated satellite positioning data from the SDS 30(1) or 30(2) prior to expiration of the current GPS assistance data file. Alternatively, a designated particular provisioning server can perform the download from the SDS 30(1) or 30(2) and packaging of the GPS assistance data file on behalf of the other provisioning servers and distribute the GPS assistance data file to the other provisioning servers so that only one provisioning server polls the SDS 30(1) or 30(2).

The GPS assistance data file comprises GPS assistance data for all GPS satellites known to the SDS 30(1) or 30(2) orbiting the earth. The GPS assistance data file includes data for all of the satellites known to the SDS precise GPS satellite orbit (azimuth, longitude and latitude) and clock information, initial position and time estimate. In addition, the GPS assistance data file may include, for each satellite, the following data: Reference Time data representing time, Universal Time (UTC) Model data indicating the time reference model used, Ionospheric Model data representing a mathematical description of the ionosphere as a function of location, altitude, day of year, phase of the sun spot cycle and geomagnetic activity, Almanac data representing a set of parameters for each GPS satellite that can be used to calculate its approximate location in orbit, Navigation Model data representing a modeling method for positioning satellites and Real-Time Integrity Model data representing a verification mechanism to verify whether the satellite data can be trusted. In addition, as explained above, the GPS assistance data file includes an expiration time indicating the date and time that the GPS assistance data is no longer valid due to movement of the satellites. For any given update cycle, the GPS assistance data file stored at the provisioning server contains the same GPS assistance data for all RAPs that may request it.

Reference is now made to FIG. 6. FIG. 6 shows a ladder flow diagram for the operations of (and signals exchanged between) a RAP and the provisioning server in connection with the streamlined GPS assistance data distribution techniques. The flow shown in FIG. 6 occurs to when a RAP is first booted up for operation in a wireless cellular network.

When a RAP first boots up, at 110, the RAP initiates a GPS lock process in the GPS receiver unit of the RAP. At 115, the RAP sends a request for a new operation session to a provisioning server. The selection of which provisioning server that the RAP connects to may be made by an intermediate gateway device not shown or described herein because it does not pertain to the GPS assistance data distribution techniques described herein. The RAPs are configured (e.g., at the time of product manufacture) with the Universal Resource Locator (URL) of the provisioning server where it is to obtain the GPS assistance data and their expected locations (based on registration data or another source). The configuration is accomplished by any number of configuration protocols such as TR-069, Simple Network Management Protocol (SNMP), etc.

Upon receiving the request from a RAP, at 220, the provisioning server sends a configuration message to the RAP that includes the expected location (latitude/longitude coordinates) of the RAP and a list of network time servers that the RAP can connect to in order to synchronize its clock. The provisioning server knows the expected location of the RAP because when the RAP is sold to a user/customer, the expected (deployment and service) location of the RAP is determined for regulatory/licensing purposes. A wireless cellular network service provider manages where RAPs are to be operated and licenses a user to operate a RAP only for a particular geographical location. When the user wishes to move the RAP to another location, the user obtains permission from the service operator and stores information indicating the new expected location of the RAP. The expected location information is associated with a device identifier of the RAP, such as a serial number or a media access control (MAC) address of its primary Ethernet port. Thus, the data representing the expected location of the RAP sent to the RAP at 220 identifies the location (latitude/longitude) where the service operator is expecting the RAP device to be used. Operation 220 is performed some time after operation 210 shown in FIG. 5.

At 120, the RAP uses the data received at 220, selects a time server and queries the time server to synchronize its clock. If the boot event is a reboot event, then an additional operation is performed at this point for the RAP to evaluate whether its stored GPS assistance data file has expired. At 125, the RAP sends a request to the provisioning server for GPS assistance data at initial boot-up or if the GPS assistance data file has expired upon a reboot. At 225, the provisioning server downloads the GPS assistance data file to the RAP. For example, the RAP uses a secure HTTP link (configured into the RAP as explained above) to download the GPS assistance data file. As explained above, the GPS assistance data file indicates or contains information representing locations for a plurality of GPS satellites.

At 130, the RAP parses the GPS assistance data file, saves it in persistent storage (e.g., memory 19) and passes it to the GPS receiver unit in the RAP together with the data indicating the expected location of the RAP and the current time. At 140, the GPS receiver unit in the RAP determines which specific satellites (subset of satellites) from the list of satellites contained in the GPS assistance data to focus on based on the expected location data and current time, and attempts to GPS lock. The GPS receiver unit uses the GPS assistance data to more efficiently achieve GPS lock. The operations to receive the GPS assistance data, select a subset of the plurality of GPS satellites indicated in the GPS assistance data based on the expected location of the RAP (and the current time) may be performed by the controller 12 of the RAP (instead of by the GPS receiver unit) and the controller 12 would then send a command with the data for the selected subset of GPS satellites to the GPS receiver unit which then attempts to GPS lock using the selected subset of GPS satellites. In either case, the GPS assistance data file, the expected location of the RAP and the current time allows the RAP to select a subset of the plurality of GPS satellites for which the RAP attempts a GPS lock.

At 150, as the RAP continues to try to acquire a GPS lock, the RAP determines if the GPS assistance data that it has cached (the most recent downloaded version) has expired based on a comparison of the current time with the expiration time of the GPS assistance data file. If the GPS assistance data file has expired prior to obtaining GPS lock, the RAP sends a request to the provisioning server for an updated GPS assistance data file, downloads it and sends it to the GPS receiver unit. This cycle of downloading new or updated GPS assistance data may repeat until the GPS receiver unit achieves GPS lock.

At 155, when the GPS receiver unit achieves GPS lock, it sends a notification to the controller of the RAP together with the GPS location data (e.g. latitude, longitude, altitude, etc.). At 160, the RAP sends the GPS location information to the provisioning server. Once the GPS receiver unit achieves GPS lock, it no longer needs to poll the provisioning server for GPS assistance data because the assistance data is obtained/tracked from the satellites to which the GPS receiver unit has locked. When the lock is lost and a GPS position is required again, the process of downloading the GPS assistance data file may be repeated.

At 230, when the provisioning server determines that the RAP's actual location (based on the GPS location information) matches the expected location of the RAP (within some tolerance), it sends a message to the RAP to activate service for the RAP. The RAP can then begin transmitting and receiving signals with UEs.

While the foregoing procedure depicted in FIG. 6 has been described with respect to service activation of a RAP, this is not meant to be limiting. For example, the techniques described herein may be performed not as part of a service activation (boot or re-boot) procedure, rather in connection with any occasion that a RAP is to acquire GPS lock.

The operations depicted in FIG. 6 are performed as between each of the plurality of provisioning servers 30(1)-30(M) and any given RAP device 10(1)-10(N). Thus, each provisioning server is configured to store GPS assistance data (for all GPS satellites known to the SDS 30(1) or 30(2)) and to respond to requests from RAPs to download the GPS assistance data to the RAPs.

FIG. 6 shows the operational flow for initial boot-up of a RAP. During a re-boot of a RAP, the RAP first checks if its saved GPS assistance data file has not expired. If it has not expired, the RAP uses that data file and operations 125 and 225 are not performed. Operation 220 is optional (since the RAP configuration data may persist across reboots. If the data file has expired, operations 125 and 225 are performed.

Figure 7:
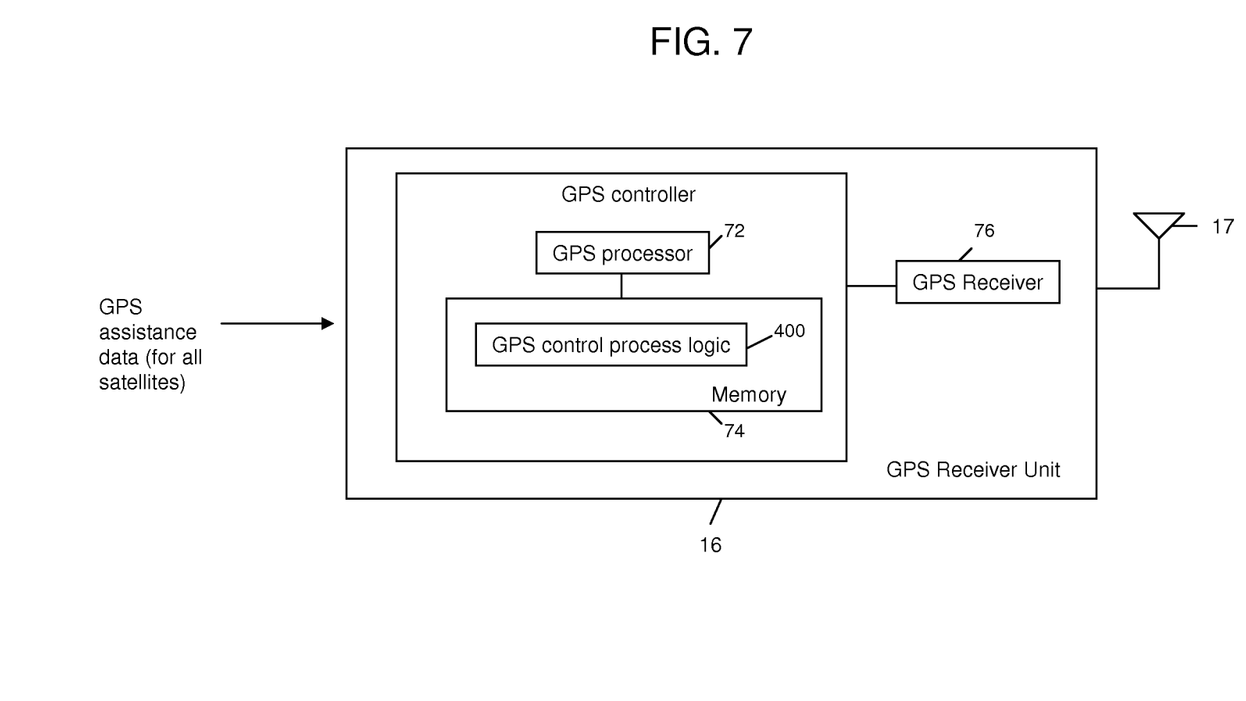
FIG. 7 is an example of a block diagram of a GPS receiver unit configured to operate on the GPS assistance data.

Reference is now made to FIG. 7. FIG. 7 shows an example of a more detailed block diagram for the GPS receiver unit 16. The GPS receiver unit 16 comprises a controller block comprising a GPS processor 72 and memory 74 that stores instructions for GPS control process logic 400. A GPS receiver 76 is coupled to the controller 70. The GPS controller 70 may be a digital signal processor (DSP) configured with firmware to perform the GPS control operations including the operations described herein. The GPS receiver 76 tunes to the appropriate frequencies of the satellite GPS signals to receive and down convert the satellite GPS signals to baseband for processing by the GPS controller 70. The GPS controller 70 sends controls to the GPS receiver 76 as to which satellites to attempt to receive signals. The GPS control process logic 400 performs a variety of functions to obtain a GPS lock and GPS location, including the operation shown at 140 in FIG. 6. That is, the GPS controller 70 receives the parsed GPS assistance data, the expected location and the current time. The GPS controller 70 selects a subset of the satellites listed or indicated in the GPS assistance data for which to focus a GPS lock attempt based on the expected location of the RAP and current time. The GPS controller then attempts to GPS lock to the selected subset of satellites to determine a GPS location of the RAP. The GPS controller 70 returns the GPS lock and GPS location results to the RAP controller when a GPS lock is obtained.

The GPS assistance data distribution techniques described herein are more scalable than other techniques heretofore known because requests from individual RAPs do not go to the SDS 30(1) or 30(2). The SDS does not need to provide data based on an expected location of the RAP. The GPS assistance data provided to the RAP contains data for all satellites known to the satellite data source, i.e., SDS 30(1) or 30(2). The downloading mechanism (e.g., HTTP) is simple to scale across multiple RAPs. By providing the RAP with its expected location and the ability to synchronize to a network time reference, the RAP is capable of locking to the appropriate GPS satellites efficiently.

Furthermore, the back-end support for these distribution techniques is simplified because the GPS assistance data is the same for all RAPs. It is not customized for every RAP. There is no need for the back-end systems to determine which satellites may be in view of any given RAP device because the data for all the satellites is provided to the RAP. The GPS assistance data is updated for all satellites on a periodic basis (e.g., every 30 minutes) and cached on the provisioning servers which have HTTP file servers or use any other file downloading technology to support download requests from RAPs. Any number of caching servers (provisioning servers) can be added as needed. The size of the GPS assistance data file is, for example, 4 Kb of data, which can be further compressed. The protocol to download the GPS assistance data is agnostic to any radio and user technology. Finally, the RAP caches the GPS assistance data file and re-uses it until the data expires based on an expiration time provided in the data file. This also reduces overhead on the back-end systems.

The foregoing techniques are not limited to a RAP device and they may be useful for any device that requires a GPS lock for which its expected location is known. Furthermore, while the foregoing GPS data distribution techniques are described with respect to a GPS assistance data file, the GPS assistance data need not be packaged/stored and transmitted as a self-contained "file" per se. For example, a provisioning server may cache the GPS assistance data in memory and provide it to RAPs via messages, such as remote procedure calls. In this latter case, there is no GPS assistance data file per se, but the same GPS assistance data is ultimately distributed to RAPs.

The above description is intended by way of example only.

What is claimed is:

1. A method comprising:
   at a provisioning server, retrieving from a data server of a reference network that collects satellite monitoring information from reference stations satellite positioning data for a plurality of global positioning system (GPS) satellites;
   at the provisioning server, generating GPS assistance data by converting the satellite positioning data into a GPS assistance data file that includes an expiration time within the GPS assistance data file, wherein the GPS assistance data comprises location data for the plurality of GPS satellites and data for types of GPS satellites from the satellite positioning data, and wherein the expiration time within the GPS assistance data file indicates a time period in which the provisioning server is able to receive the satellite positioning data such that after the time period, any satellite positioning data obtained by the provisioning server is not valid;
   at the provisioning server, determining an expected location of a device based on preconfigured information stored at the provisioning server that is associated with the device;
   sending to the device data representing the expected location of the device; and
   sending the GPS assistance data file from the provisioning server to the device to cause the device to select a subset of the plurality of GPS satellites based on the expected location of the device for which the device attempts a GPS lock such that when the device attempts the GPS lock, the device determines if the satellite positioning data of the GPS assistance data contained in the GPS assistance data file received from the provisioning server is valid based on the expiration time contained in the GPS assistance data file.

2. The method of claim 1, wherein generating the GPS assistance data comprises generating the expiration time for satellite positioning data that is included in the GPS assistance data file.

3. The method of claim 2, and further comprising storing the GPS assistance data file at the device, and downloading an updated GPS assistance data file from the provisioning server to the device when the device determines that the GPS assistance data file has expired prior to achieving GPS lock.

4. The method of claim 1, and further comprising storing GPS assistance data at the provisioning server, and the provisioning server periodically retrieving updated satellite positioning data from the data server and generating updated GPS assistance data from the updated satellite positioning data.

5. The method of claim 4, and further comprising storing GPS assistance data at each of a plurality of provisioning servers, wherein each provisioning server is configured to respond to requests from devices to download the GPS assistance data to devices.

6. The method of claim 5, and further comprising designating a particular provisioning server of the plurality of provisioning servers to retrieve updated satellite positioning data from the data server, generating the GPS assistance data at the particular provisioning server from the updated satellite positioning data and distributing the GPS assistance data to the other provisioning servers.

7. The method of claim 1, wherein retrieving comprises retrieving satellite positioning data for all GPS satellites known to the data server and generating comprises generating the GPS assistance data comprising data for all GPS satellites known to the data server.

8. The method of claim 1, wherein sending the GPS assistance data comprises:
   obtaining satellite position data from a reference network that collects satellite feed and satellite monitoring information from reference stations; and
   sending the satellite monitoring information to the device.

9. The method of claim 1, further comprising:
   polling satellite positioning data periodically at the provisioning server from a GPS data source; and
   retrieving satellite positioning data for all satellites known to a satellite data server.

10. The method of claim 1, further comprising:
    querying a satellite data server for satellite positioning data; and
    distributing the satellite positioning data among a set of redundant or regional provisioning servers.

11. An apparatus comprising:
    a network interface unit configured to enable communications over a network;
    a processor configured to be coupled to the network interface unit, the processor configured to:
      retrieve from a data server of a reference network that collects satellite monitoring information from reference stations satellite positioning data for a plurality of global positioning system (GPS) satellites;
      generate GPS assistance data by converting the satellite positioning data into a GPS assistance data file that includes an expiration time within the GPS assistance data file, wherein the GPS assistance data comprises location data for the plurality of GPS satellites and data for types of GPS satellites from the satellite positioning data, and wherein the expiration time within the GPS assistance data file indicates a time period in which the apparatus is able to receive the satellite positioning data such that after the time period, any satellite positioning data obtained by the apparatus is not valid;
      determine an expected location of a device based on preconfigured information stored at the provisioning server that is associated with the device;
      send to the device data representing the expected location of the device; and
      send the GPS assistance data file to the device to cause the device to select a subset of the plurality of GPS satellites for which the device attempts a GPS lock based on the expected location of the device such that when the device attempts the GPS lock, the device determines if the satellite positioning data of the GPS assistance data contained in the GPS assistance data file received from the apparatus is valid based on the expiration time contained in the GPS assistance data file.

12. The apparatus of claim 11, wherein the processor is configured to generate the expiration time for satellite positioning data that is included in the GPS assistance data file.

13. The apparatus of claim 12, wherein the processor is configured to download updated GPS assistance data to the device when the device determines that the GPS assistance data file has expired prior to achieving GPS lock.

14. The apparatus of claim 11, wherein the processor is configured to store the GPS assistance data in memory, to periodically retrieve updated satellite positioning data from the data server, and to generate updated GPS assistance data from the updated satellite positioning data.

15. The apparatus of claim 11, wherein the controller is configured to distribute the GPS assistance data to a plurality of provisioning servers which are in turn configured to download the GPS assistance data to devices in response to request from the devices.

16. The apparatus of claim 11, wherein the processor is configured to retrieve satellite positioning data for all GPS satellites known to the data server and to generate the GPS assistance data comprising data for all GPS satellites known to the data server.

17. A tangible computer readable medium storing instructions that, when executed by a processor, cause the processor to:
retrieve from a data server of a reference network that collects satellite monitoring information from reference stations satellite positioning data for a plurality of global positioning system (GPS) satellites;
generate GPS assistance data by converting the satellite positioning data into a GPS assistance data file that includes an expiration time within the GPS assistance data file, wherein the GPS assistance data comprises location data for the plurality of GPS satellites and data for types of GPS satellites from the satellite positioning data, and wherein the expiration time within the GPS assistance data file indicates a time period in which a provisioning server is able to receive the satellite positioning data such that after the time period, any satellite position data obtained by the provisioning server is not valid;
determine an expected location of a device based on preconfigured information stored at the provisioning server that is associated with the device;
send to the device data representing the expected location of the device; and
send the GPS assistance data to the device to cause the device to select a subset of the plurality of GPS satellites based on the expected location of the device for which the device attempts a GPS lock such that when the device attempts the GPS lock, the device determines if the satellite positioning data of the GPS assistance data contained in the GPS assistance data file received from the provisioning server is valid based on the expiration time contained in the GPS assistance data file.

18. The tangible computer readable medium of claim 17, wherein the instructions that cause the processor to generate comprise instructions that cause the processor to generate the expiration time for satellite positioning data that is included in the GPS assistance data file.

19. The tangible computer readable medium of claim 17, and further comprising instructions that cause the processor to periodically retrieve updated satellite positioning data from the data server and to generate updated GPS assistance data from the updated satellite positioning data.

20. A system comprising:
at least one provisioning server configured to:
retrieve from a data server of a reference network that collects satellite monitoring information from reference stations satellite positioning data for a plurality of global positioning system (GPS) satellites;
generate GPS assistance data by converting the satellite positioning data into a GPS assistance data file that includes an expiration time within the GPS assistance data file, wherein the GPS assistance data comprises location data for the plurality of GPS satellites and data for types of GPS satellites from the satellite positioning data, and wherein the expiration time within the data file indicates a time period in which the provisioning server is able to receive the satellite positioning data such that after the time period, any satellite positioning data obtained by the provisioning server is not valid; and
a plurality of radio access point devices, each radio access point device configured to serve user equipment in a wireless cellular network and to be deployed for operation at a corresponding expected location, wherein each radio access point device is configured to:
retrieve from the provisioning server data representing an expected location of the radio access point device; and
retrieve the GPS assistance data file from the provisioning server to select a subset of the plurality of GPS satellites indicated in the GPS assistance data contained in the GPS assistance data file based on the corresponding expected location of the radio access point device and to attempt a GPS lock using the selected subset of the plurality of GPS satellites to determine a GPS location such that when the radio access point device attempts the GPS lock, the radio access point device determines if the satellite positioning data of the GPS assistance data contained in the GPS assistance data file received from the provisioning server is valid based on the expiration time contained in the GPS assistance data file.

21. The system of claim 20, wherein the provisioning server is configured send to a radio access point device data indicating the expected location of the radio access point device.

22. The system of claim 20, wherein the provisioning server generates the expiration time for the satellite positioning data included in the GPS assistance data file, and wherein each radio access point device is configured to download an updated GPS assistance data file from the provisioning server when it determines that the GPS assistance data file stored at the radio access point device has expired prior to it achieving GPS lock.

23. The system of claim 20, wherein the provisioning server is configured to periodically retrieve updated satellite positioning data from the data server and to generate updated GPS assistance data from the updated satellite positioning data, and wherein the GPS assistance data comprising data for all GPS satellites that are known to the data server.

24. The system of claim 20, and comprising a plurality of provisioning servers each configured to communicate with the data server and to respond to requests from radio access point devices to download the GPS assistance data to radio access point devices.

25. The system of claim 24, wherein a particular provisioning server is configured to retrieve updated satellite positioning data from the data server, generate the GPS assistance data and distribute the GPS assistance data to the other provisioning servers.

* * * * *